United States Patent [19]

Curtis et al.

[11] Patent Number: 5,029,978
[45] Date of Patent: Jul. 9, 1991

[54] OPTICAL PHASE MODULATOR

[75] Inventors: Alan C. Curtis; Michael L. Henning, both of Somerset, Great Britain

[73] Assignee: GEC-Marconi Limited, Stanmore, England

[21] Appl. No.: 394,107

[22] Filed: Aug. 14, 1989

[30] Foreign Application Priority Data

Aug. 16, 1988 [GB] United Kingdom ............... 8819468

[51] Int. Cl.$^5$ ............................................. G02B 6/26
[52] U.S. Cl. .................... 350/96.29; 350/96.15
[58] Field of Search ............... 350/96.13, 96.14, 96.15, 350/96.29, 96.3, 96.34

[56] References Cited

U.S. PATENT DOCUMENTS

| 4,002,896 | 1/1977 | Davies et al. | 350/96.29 X |
| 4,235,113 | 11/1980 | Carome | 350/96.29 X |
| 4,525,818 | 6/1985 | Cielo et al. | 350/96.15 X |
| 4,729,620 | 3/1988 | Pavlath | 350/96.3 |
| 4,792,207 | 12/1988 | Shaw et al. | 350/96.29 |
| 4,844,577 | 7/1989 | Ninnis et al. | 350/96.29 |
| 4,886,333 | 12/1989 | Hicks | 350/96.15 |

FOREIGN PATENT DOCUMENTS 2166020 4/1986 United Kingdom .

Primary Examiner—William L. Sikes
Assistant Examiner—John Ngo
Attorney, Agent, or Firm—Fleit, Jacobson, Cohn, Price, Holman & Stern

[57] ABSTRACT

An optical phase modulator comprises a body 1 of a matrix material which supports a length of optical fiber 2, the said body including a polymer material having piezoelectric properties and being provided with spaced electrode areas 4 such that the application of an electrical potential between said areas will produce a mechanical strain in the body 1, the said strain affecting the said fiber 2 so as to control phase modulation of light when this is present in the fibre. This can give a device of inexpensive construction which is robust and has high sensitivity.

8 Claims, 2 Drawing Sheets

OPTICAL PHASE MODULATOR

This invention relates to an optical phase modulator device and it relates particularly to a modulator suited for fibre optic communication.

In the field of fibre optic communication, whether of speech in telephone networks and the like or of data as in industrial sensing and aerospace sensing and control applications, the ability of a single optical fibre to carry many parallel streams of information is one of the primary advantages. This capability can be utilised if suitable means of impressing the information on the optical signal is available. The information to be carried is commonly impressed on the optical signal by multiplexing techniques involving changes in frequency, amplitude or phase. The present invention was devised in an attempt to construct a simple and robust phase modulator.

According to the invention, there is provided an optical phase modulator comprising a body of a matrix material which supports a length of optical fibre, the said body including a polymer material having piezoelectric properties and being provided with spaced electrode areas such that the application of an electrical potential between said areas will produce a mechanical strain in the body, the said strain affecting the said fibre so as to control phase modulation of light when this is present in the fibre.

The said fibre may be embedded in the polymer body.

In one embodiment, electrode areas are located on opposite faces of said body. In a different embodiment, one of said electrode areas is carried on a surface of said fibre. The fibre may be arranged in the form of a coil within the said body. Alternatively, the fiber is arranged longitudinally within a body of elongated form.

The matrix material may be composed of two or more chemcial phases. For example, the matrix material may comprise one continuous chemical phase with another dispersed phase. The matrix material may have isotropic properties.

By way of example, some particular embodiments of the invention will now be described with reference to the accompanying drawings, in which:

FIG. 1 is a phase modulator having a cylindrical body with a coil of optical fibre embedded therein, FIG. 2 is a part cross-sectional view of the phase modulator of FIG. 1, FIG. 3 is a different embodiment of phase modulator having an annular body with an embedded optical fibre, FIG. 4 is a cross-sectional view of the phase modulator of FIG. 3, FIG. 5 is a similar view to that of FIG. 4 showing an alternative electrode arrangement, FIG. 6 to 9 show further embodiments in the form of a cylinder with an externally wound optic fibre, FIG. 10 is a further embodiment of phase modulator having an elongated body with an embedded optical fibre, and, FIG. 11 is an embodiment similar to that of FIG. 10 but with a different electrode arrangement.

As depicted in FIG. 1, the phase modulator comprises a body 1 of a matrix material which has been formed into the shape of a short cylinder and which carries a coiled length of optical fibre 2 that has been embedded therein. The two ends 3 of the fibre emerge on the outside of the body so that they may be connected to means for propagating an optical signal along said fibre and for detecting said signal after it has passed along the fibre.

Some examples of suitable matrix materials include a piezoelectric composite material formed from a dispersion of one or more chemical phases in a suitable matrix. One or more of the phases will be of a piezoelectric material such that the composite will exhibit piezoelectric properties.

One particular example of matrix material is lead titanate or a modified lead titanate or other piezoelectric ceramic particles dispersed in a suitable martrix with the required electrical properties. Martrix examples include a polyurethane, epoxy resin, nitrile rubber or other suitable polymeric material.

The cross-sectional view of FIG. 2 shows that the flat surfaces of the cylindrical polymer body 1 are provided with conductive electrode areas 4. By application of appropriate electrical potentials to the electrode areas, it is possible to strain the piezoelectric material of the body so that the optical fibre 2 will tend to be compressed or stretched. This will cause a change to appear in an optical signal passed along the fibre. Detection of this change in suitable apparatus for measuring a change in optical phase will give an indication of the presence of the potential at the electrodes. A suitable electrical drive signal at the electrodes will allow the output optical signal to be phase modulated so the device could form the basis of a fibre-optic phase modulator. Such a phase modulator could be simple, robust and inexpensive to construct.

FIG. 3 shows a different embodiment with a phase modulator having an annular body 1 in which is embedded a coiled length of optical fibre 2. FIG. 4 is a cross-sectional view of this embodiment where the electrode areas 4 have been formed on the plane upper and lower surfaces of the polymer body 1. FIG. 5 is an alternative construction where the electrode areas 4 have been deposited on the inner and outer curved surfaces of the polymer body 1.

In these embodiments incorporating an annular body, the body 1 may be provided with end caps 6.

FIG. 6 shows a further embodiment where the cylindrical polymer body 1 has the optical fibre 2 wound on its external curved surface. The body 1 carries electrode areas 4 on the planar cylinder ends. In FIG. 7, the body is in the form of a tube carrying the fibre 2 on its external surface. FIG. 8 is a cross-sectional view showing the optional end caps 6. Electrode areas 4 are located on the flat tube ends.

Figure 1:
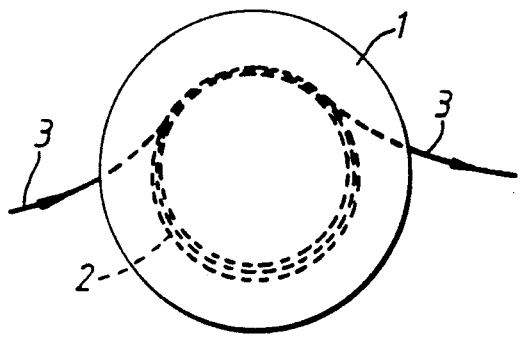
Figure 2:
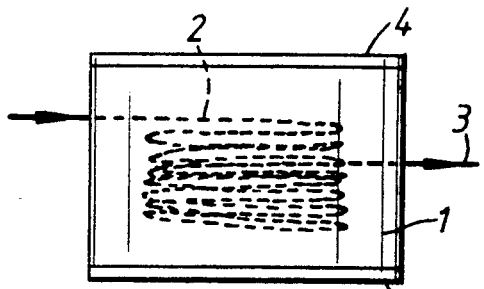
Figure 3:
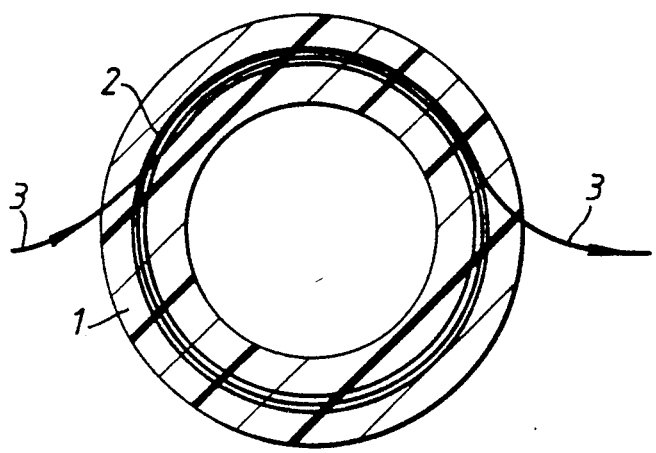
Figure 4:
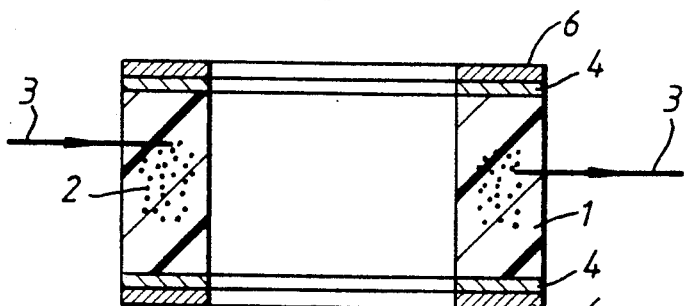
Figure 5:
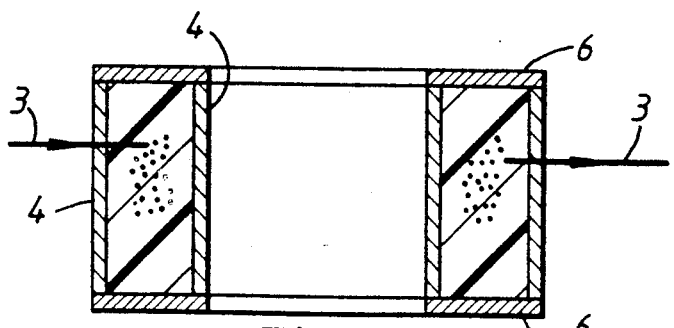
Figure 6:
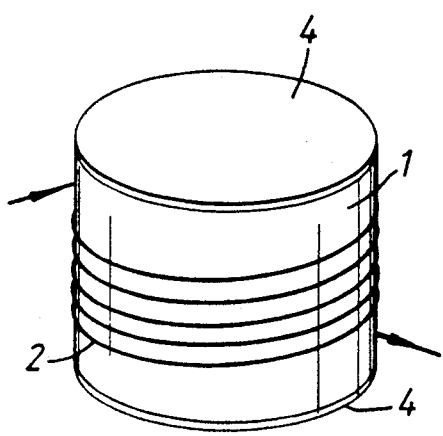
Figure 7:
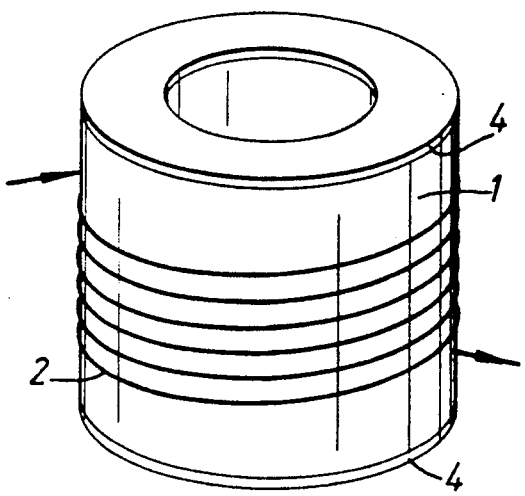
Figure 8:
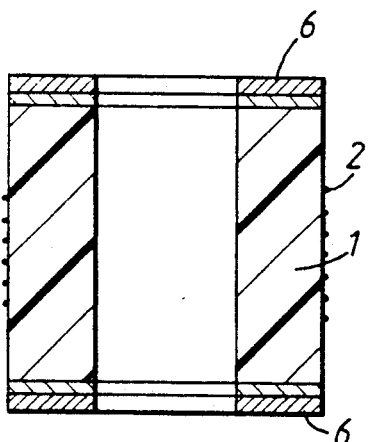
Figure 9:
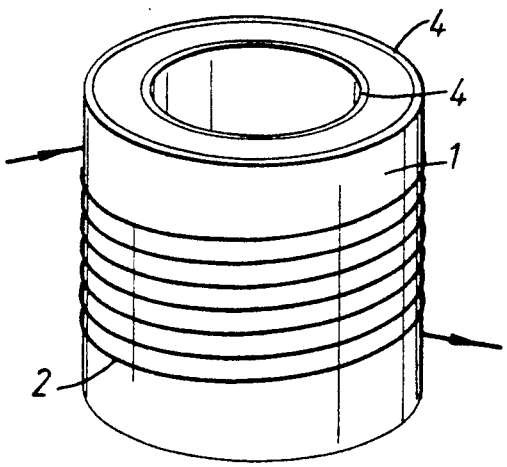
FIG. 9 shows a similar tubular body with electrode areas 4 located on the inner and outer curved surfaces.
Figure 10:
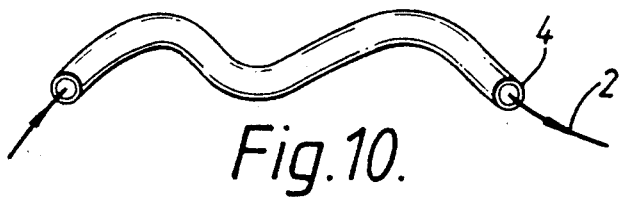
FIG. 10 shows a further embodiment in which the optical fibre is arranged longitudinally in a body of matrix material having an elongated form. In this example, one of the electrode areas 4 is located on the otuer surface of the piezoelectric body whilst a second electrode area is on the surface of the optical fibre 2.
Figure 11:
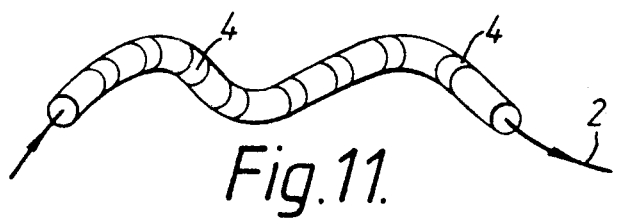
FIG. 11 shows yet a further embodiment similar to that of FIG. 10 but where the two electrode areas 4 are arranged alternately in circumferential bands along the length of the outer surface of the piezoelectric body.

The optical phase modulator of the invention has been found to be simple and inexpensive to construct using conventional polymer forming techniques. Since a substantial length of fibre can be embedded in or wouned on the matrix material this can give a high sensitivity of the device to the applied electrical drive potential.

The foregoing description of embodiments of the invention has been given by way of example only and a number of modifications may be made without departing from the scope of the invention as defined in the appended claims. For example, the piezoelectric matrix material may be a suitable polymer or copolymer such as polyvinylidene fluoride, PVdF or poly(vinylidene fluoride-trifluoroethylene), P(VdF-TrFE). The phase modulator is also not limited to modulating only the phase of light passing through the fibre, it could be used alternatively for some types of frequency modulation, and amplitude modulation is also possible.

We claim:

1. An optical phase modulator comprising a body of a matrix material which supports a length of optical fibre, the said body being a polymer material having piezoelectric properties and being provided with spaced electrode areas such that the application of an electrical potential between said areas will produce a mechanical strain in the body, the said strain affecting the said fibre so as to control phase modulation of light when this is present in the fibre and said fibre is arranged in the form of a coil within the said body.

2. A phase modulator as claimed in Claim 1, in which the said fibre is embedded in the polymer body.

3. A phase modulator as claimed in claim 1 in which electrode areas are located on opposite faces of said body.

4. A phase modulator as claimed in claim 1 in which one of said electrode areas is carried on a surface of said fibre.

5. A phase modulator as claimed in claim 1 in which the fibre is arranged longitudinally within a body of elongated form.

6. A phase modulator as claimed in claim 1 in which the matrix material is composed of two or more chemical phases.

7. A phase modulator as claimed in claim 1 in which the matrix material has isotropic properties.

8. A phase modulator as claimed in claim 1 in which the matrix material comprises one continuous chemical phase with another dispersed phase.

* * * * *